(12) United States Patent
Kitazawa

(10) Patent No.: US 10,375,499 B2
(45) Date of Patent: Aug. 6, 2019

(54) SOUND SIGNAL PROCESSING APPARATUS, SOUND SIGNAL PROCESSING METHOD, AND STORAGE MEDIUM

(71) Applicant: CANON KABUSHIKI KAISHA, Tokyo (JP)

(72) Inventor: Kyohei Kitazawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/631,934

(22) Filed: Jun. 23, 2017

(65) Prior Publication Data

US 2018/0007487 A1    Jan. 4, 2018

(30) Foreign Application Priority Data

Jun. 29, 2016   (JP) ................. 2016-128786

(51) Int. Cl.
| | |
|---|---|
| H04R 3/00 | (2006.01) |
| H04S 7/00 | (2006.01) |
| G11B 20/10 | (2006.01) |
| H04R 25/00 | (2006.01) |
| H04R 29/00 | (2006.01) |
| G10L 21/0216 | (2013.01) |
| G10L 21/0272 | (2013.01) |

(52) U.S. Cl.
CPC .......... *H04S 7/301* (2013.01); *G10L 21/0272* (2013.01); *H04R 3/005* (2013.01); *H04R 25/407* (2013.01); *G10L 2021/02166* (2013.01); *G11B 2020/10546* (2013.01); *H04R 29/005* (2013.01); *H04R 2410/05* (2013.01)

(58) Field of Classification Search
CPC ............. H04R 3/005; H04R 2430/20; H04R 2410/05; H04R 2430/21; H04R 29/005; H04R 25/407; G10L 2021/02166; G10L 21/028; G10L 21/0272; G10L 2021/02082; H04S 7/301; H04S 2400/15; H04S 7/303; G11B 2020/10546

USPC ........................................ 381/92, 122, 56
See application file for complete search history.

(56) References Cited

U.S. PATENT DOCUMENTS

| | | | | |
|---|---|---|---|---|
| 6,650,756 | B1* | 11/2003 | Saito ................... | H03H 21/0012 381/71.11 |
| 2015/0063590 | A1* | 3/2015 | Katagiri ................ | H04R 1/406 381/92 |
| 2016/0198258 | A1* | 7/2016 | Katagiri ................ | H04R 1/406 381/92 |

FOREIGN PATENT DOCUMENTS

| | | |
|---|---|---|
| JP | 2012-165189 A | 8/2012 |
| JP | 2014-72708 A | 4/2014 |

* cited by examiner

*Primary Examiner* — Yogeshkumar Patel
(74) *Attorney, Agent, or Firm* — Canon U.S.A., Inc. IP Division

(57) ABSTRACT

A sound signal processing apparatus includes a sound acquisition unit, a processing unit, an output unit, and a control unit. The sound acquisition unit is configured to acquire sound data generated by collecting a sound from a sound-collecting target space. The processing unit is configured to execute, on the sound data acquired by the sound acquisition unit, signal processing corresponding to each of a plurality of areas included in the sound-collecting target space. The output unit is configured to output processed data generated based on the signal processing executed by the processing unit. The control unit configured to perform control such that an amount of processing performed by the processing unit does not exceed a predetermined amount of processing.

24 Claims, 7 Drawing Sheets

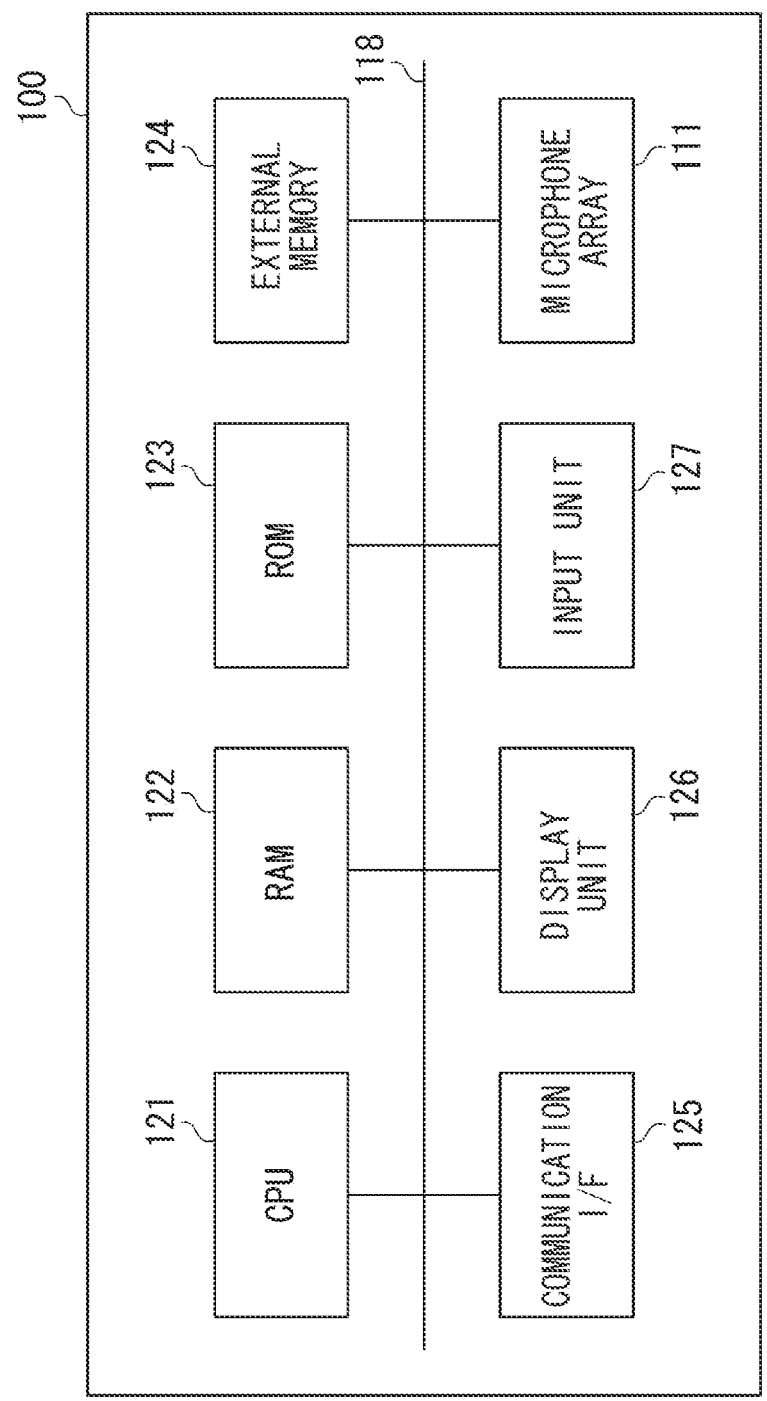

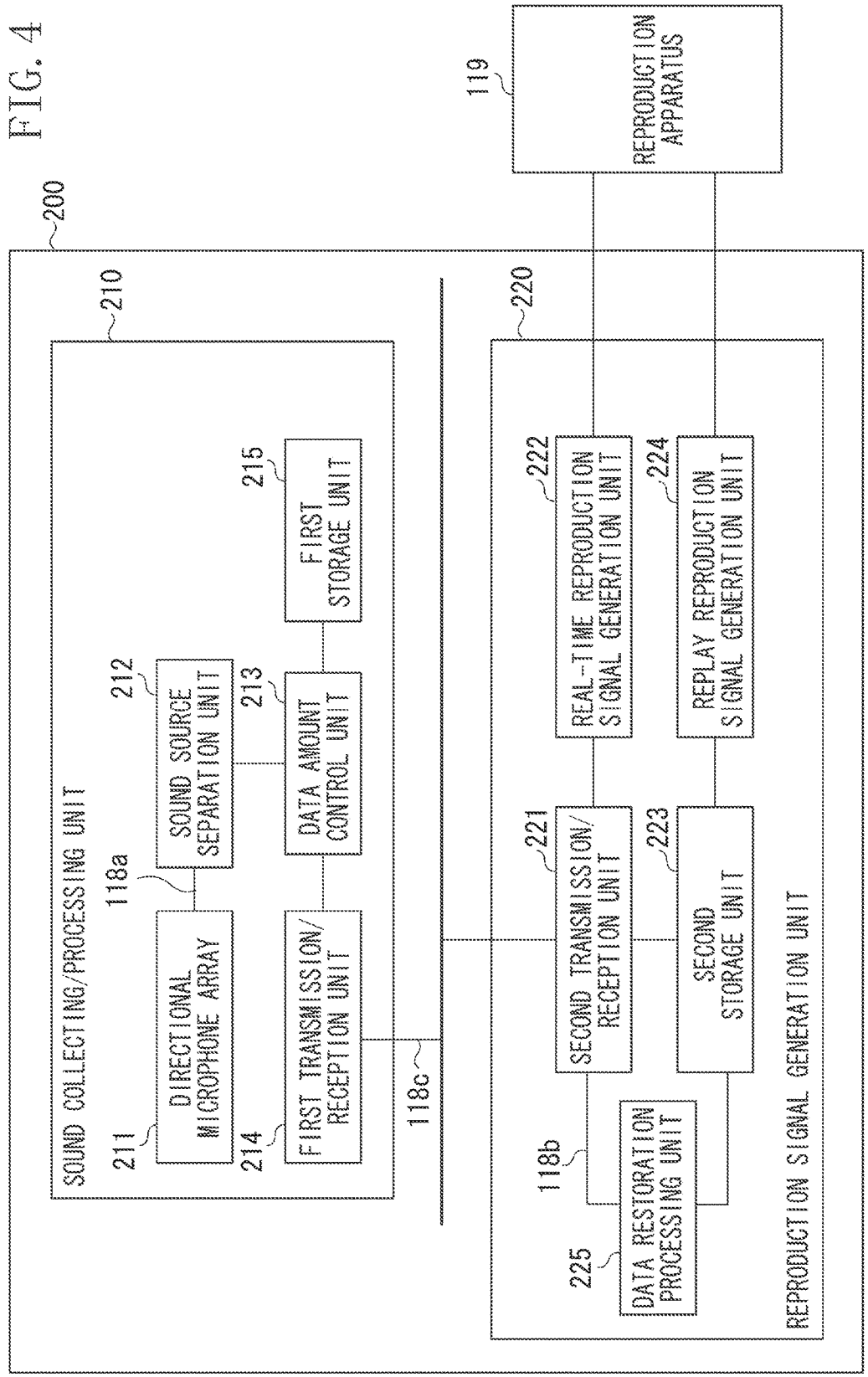

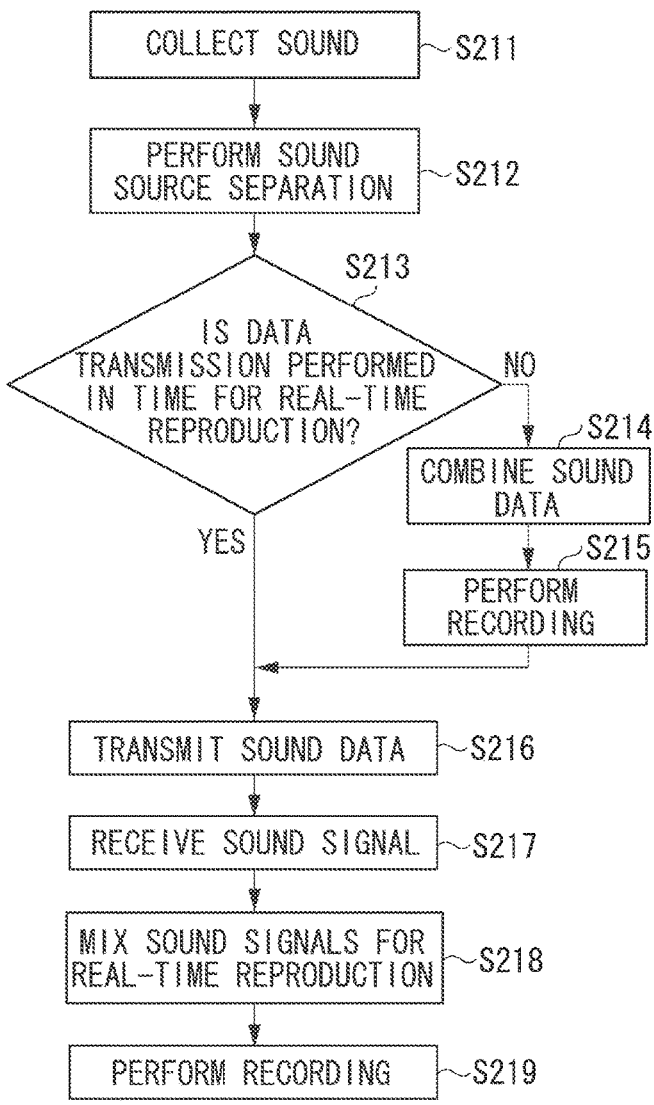
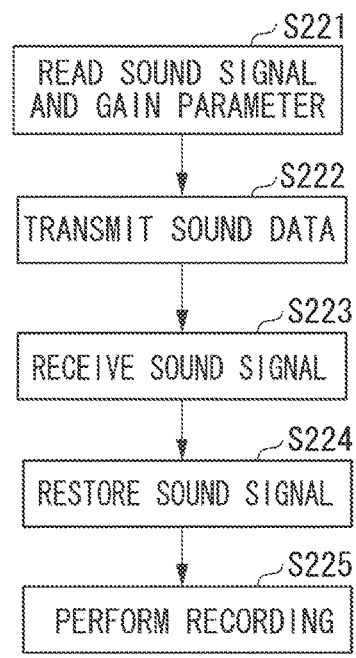
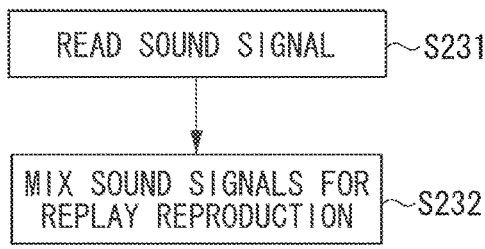
FIG. 5A
FIG. 5B
FIG. 5C

SOUND SIGNAL PROCESSING APPARATUS, SOUND SIGNAL PROCESSING METHOD, AND STORAGE MEDIUM

BACKGROUND OF THE INVENTION

Field of the Invention

One disclosed aspect of the embodiments relates to sound signal processing apparatuses and sound signal processing methods.

Description of the Related Art

The technique, discussed in Japanese Patent Application Laid-Open No. 2014-72708, for dividing a space into a plurality of areas and acquiring (collecting) sound from each of the plurality of areas is known as the conventional technique. Japanese Patent Application Laid-Open No. 2012-165189 discusses a technique for collecting sound with increased directivity, and clear recording and enhancement of distant sound can be facilitated. As discussed in Japanese Patent Application Laid-Open No. 2012-165189, use of microphones having increased directivity and capability of recording distant sound in collecting sound from target areas enables a significantly large space to be divided into small areas to collect sound from each of the areas.

If a large space is however divided into small areas to collect sound from each of the areas, the number of sound-collecting areas is increased. The increase in the number of sound-collecting areas leads to an increase in the amount of sound separation processing (amount of sound source separation processing) performed on each area. If, for example, real-time reproduction of the collected sound is attempted in a case where the number of sound-collecting areas is large, the sound separation processing can fail to be performed in time and which causes a defect in sound data (an interruption in the sound).

SUMMARY OF THE INVENTION

According to an aspect of the embodiments, a sound signal processing apparatus includes a sound acquisition unit, a processing unit, an output unit, and a control unit. The sound acquisition unit is configured to acquire sound data generated by collecting a sound from a sound-collecting target space. The processing unit is configured to execute, on the sound data acquired by the sound acquisition unit, signal processing corresponding to each of a plurality of areas included in the sound-collecting target space. The output unit is configured to output processed data generated based on the signal processing executed by the processing unit. The control unit is configured to perform control such that an amount of processing performed by the processing unit does not exceed a predetermined amount of processing.

Further features of the disclosure will become apparent from the following description of exemplary embodiments with reference to the attached drawings.

BRIEF DESCRIPTION OF THE DRAWINGS

FIG. 3 is a block diagram illustrating the hardware configuration of the sound signal processing apparatus according to the first exemplary embodiment.

FIG. 4 is a block diagram illustrating the configuration of a sound signal processing system according to a second exemplary embodiment.

FIGS. 5A to 5C are flow charts each illustrating sound signal processing according to the second exemplary embodiment.

DESCRIPTION OF THE EMBODIMENTS

Figure 1:
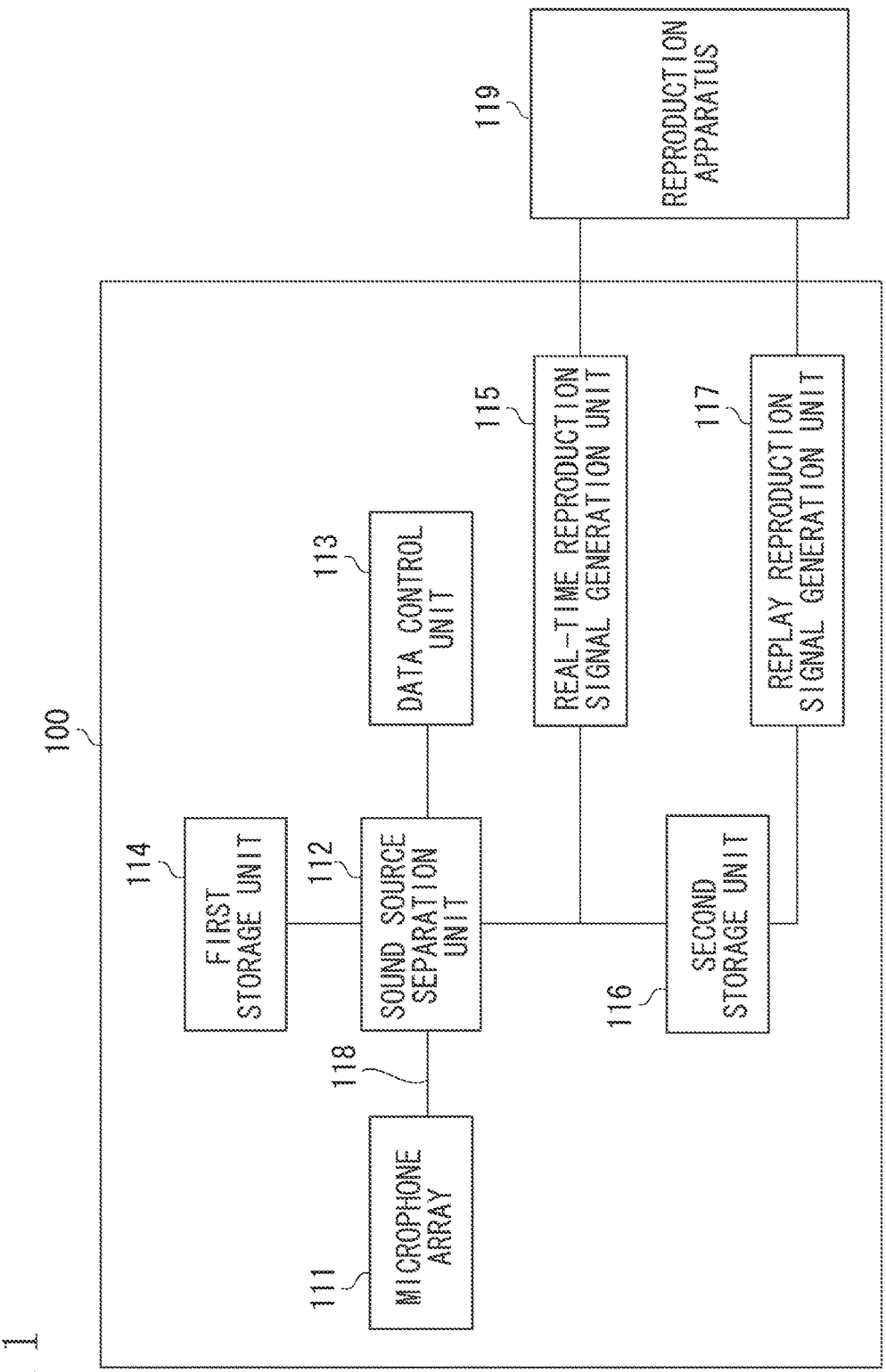
FIG. 1 is a block diagram illustrating a functional configuration of a sound signal processing apparatus according to a first exemplary embodiment.

Sound signal processing apparatuses according to various exemplary embodiments of the disclosure will be described below with reference to the drawings. The exemplary embodiments described below are not intended to limit the scope of the disclosure. Further, not every combination of features described in the exemplary embodiments below is always essential to a technical solution of the disclosure. Configurations according to the exemplary embodiments can be modified or changed as appropriate according to specifications and various conditions (use condition, use environment, etc.) of apparatuses to which the exemplary embodiments of the disclosure are applied. In the description below, similar components are given the same reference numeral and described. As used herein, the term "sound" refers to various general sounds, which can be collected by a microphone and/or represented by audio signals, such as voices, animal sounds, musical sounds, and environmental sounds, and is not limited to voices.

(Configuration of Sound Signal Processing Apparatus)

A first exemplary embodiment will be described. FIG. 1 is a functional block diagram illustrating the configuration of a sound signal processing apparatus 100. The sound signal processing apparatus 100 includes a microphone array 111, a sound source separation unit 112, a data control unit 113, a first storage unit 114, a real-time reproduction signal generation unit 115, a second storage unit 116, and a replay reproduction signal generation unit 117. The components included in the sound signal processing apparatus 100 are connected to each other via a bus 118. The sound signal processing apparatus 100 is wired or wirelessly connected to a reproduction apparatus 119. The real-time reproduction signal generation unit 115 is a reproduction unit configured to reproduce sounds in real time.

The microphone array 111 includes a plurality of microphones configured to collect sounds from a sound-collecting target space. The microphone array 111 is connected to the sound source separation unit 112. The microphone array 111 collects sounds from the space with the microphones, performs analog/digital (A/D) conversion on sound signals of the collected sounds, and then outputs the sound signals to the sound source separation unit 112. The microphone array 111 is a sound collecting unit.

The sound source separation unit 112 includes a processing device, such as a microprocessor. The sound source separation unit 112 acquires the sound signals (sound data) input from the microphone array 111 and performs sound source separation processing using the sound signals to divide the space into N (N>1) areas. The sound source separation processing is the processing of extracting from the input sound signals a sound collected from a processing target area. Specifically, the sound source separation unit 112 executes corresponding signal processing on each of the plurality of areas included in the sound-collecting target space. The sound source separation processing is performed on each processing frame, i.e., each predetermined time (time interval, time unit). For example, the sound source separation unit 112 performs beamforming processing on each predetermined time described above and acquires a sound signal for each area (a). The acquired sound signal is output together with time (t) information to the real-time reproduction signal generation unit 115 and the second storage unit 116. In the present exemplary embodiment, the number of microphones included in the microphone array 111 is M. Specifically, the microphone array 111 is an M-channel (sound channel) microphone array. Processed data generated based on the sound source separation processing performed by the sound source separation unit 112 is output to the real-time reproduction signal generation unit 115 and the second storage unit 116.

The data control unit 113 constantly detects the amount of processing performed by the sound source separation unit 112. The data control unit 113 further controls (limits) the number of sound channels used in the sound source separation performed by the sound source separation unit 112 based on the amount of processing performed by the sound source separation unit 112 and the processing capacity of the sound source separation unit 112. For example, in a case where the processing load on the sound source separation unit 112 is high and the sound source separation processing is not likely to be performed in time for the real-time reproduction if all the microphones of the microphone array 111 are used in the sound source separation processing, the data control unit 113 reduces the number of sound channels to be used in the sound source separation unit 112. Specifically, in a case where the amount of processing (processing load) performed by the sound source separation unit 112 is not below the processing capacity, the sound source separation unit 112 picks up sounds of P (P<M) channels among the M channels and performs the sound source separation processing on the sounds. The data control unit 113 controls/limits the number of sound channels to reduce the amount of data handled by the sound source separation unit 112. Specifically, the data control unit 113 performs control such that the amount of processing performed by the sound source separation unit 112 does not surpass a predetermined amount of processing (processing capacity). As used herein, the term "predetermined amount of processing" refers to the amount of processing at which a period between a first time point when a sound is collected and a second time point when a sound based on the sound collected at the first time point and based on the sound source separation processing is reproduced is equal to a threshold value or less. In the present exemplary embodiment, examples of the case where the amount of processing performed by the sound source separation unit 112 is not below the processing capacity include a case where the sound source separation processing is not performed in time for the real-time reproduction. A filter for use in the beamforming processing in the sound source separation can be prepared in advance according to the number of microphones to be used.

Further, the data control unit 113 generates and manages a data limitation list. More specifically, the data control unit 113 manages data, such as the number of microphones used, for each time and each area as the data limitation list. Further, if the processing load on the sound source separation unit 112 is decreased (to be lower than the processing capacity), the data control unit 113 refers to the data limitation list and transmits an instruction to the sound source separation unit 112 such that a frame (time frame) on which the data limitation is performed is processed again. The phrase "performs data limitation" or "limits data" refers to the limiting of the amount of sound source separation processing in the sound source separation unit 112.

The first storage unit 114 is a storage device, such as a hard disk drive (HDD), solid state drive (SSD), or memory. The first storage unit 114 records (stores), together with time information, signals of all the sound channels of a time frame on which the data limitation is performed (the number of channels is decreased) in the sound source separation unit 112. The processing capacity of the sound source separation unit 112 is stored in, for example, the first storage unit 114.

The real-time reproduction signal generation unit 115 generates a signal for real-time reproduction by mixing within a predetermined time from the time point of the sound collecting the sound signals of the respective areas that are acquired from the sound source separation unit 112, and outputs the generated signal to the reproduction apparatus 119. For example, the real-time reproduction signal generation unit 115 externally acquires a virtual listening point (listener position) and virtual listener direction (hereinafter, "the listening point and the listener direction") in a time-varying space and reproduction environment information, and mixes the sound sources. The term "reproduction environment" refers to, for example, the type (such as a stereo speaker, surround speaker, or multichannel speaker in a case of a speaker, or headphone) of the reproduction apparatus 119 which reproduces the signal generated by the real-time reproduction signal generation unit 115.

The second storage unit 116 is a storage device, such as a HDD, SSD, or memory. The second storage unit 116 records, together with area information and time information, the sound signals of the respective areas that are separated by the sound source separation unit 112.

In a case where replay reproduction is requested with designation of time, the replay reproduction signal generation unit 117 acquires sound data (sound signal) of the designated time from the second storage unit 116 and performs similar processing to the processing performed by the real-time reproduction signal generation unit 115. Then, the replay reproduction signal generation unit 117 outputs the processed sound data to the reproduction apparatus 119. Specifically, the replay reproduction signal generation unit 117 generates a signal for replay reproduction by mixing the sound signals of the respective areas that are acquired from the second storage unit 116, and outputs the generated sound signal to the reproduction apparatus 119.

(Process of Audio Signal Processing)

Figure 2A:
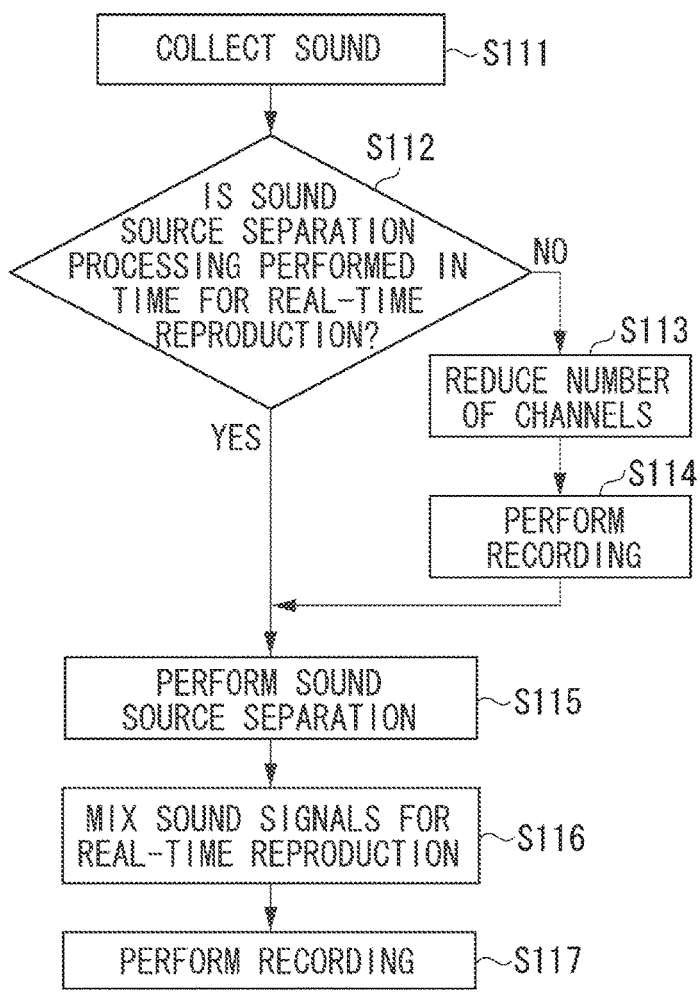
FIGS. 2A to 2C are flow charts each illustrating sound signal processing according to the first exemplary embodiment.
Figure 2B:
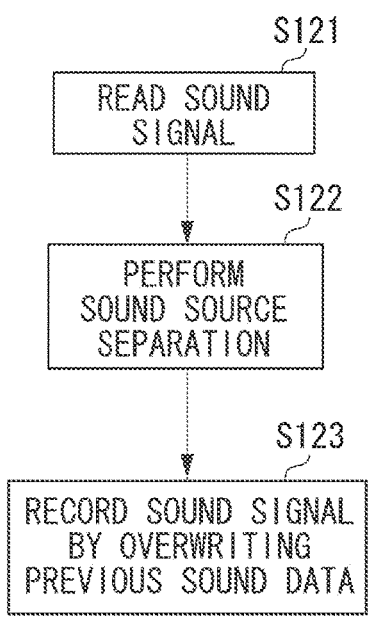
Figure 2C:
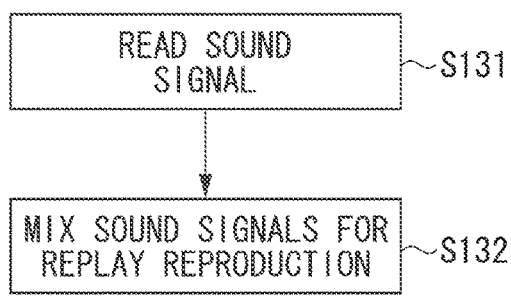

FIGS. 2A to 2C are flow charts each illustrating a process which is executed by the sound signal processing apparatus 100 according to the present exemplary embodiment.

FIG. 2A illustrates a process from the sound collecting to the generating of signal for real-time reproduction. As illustrated in FIG. 2A, in step S111, the microphone array 111 collects sounds produced in the space. Sound signals of the collected sounds of the respective channels are output from the microphone array 111 to the sound source separation unit 112.

Then, in step S112, the data control unit 113 determines whether the sound source separation processing is performed in time for the real-time reproduction, based on the amount of processing performed by the sound source separation unit 112. In a case where the data control unit 113 determines that the sound source separation processing is performed in time for the real-time reproduction (YES in step S112), the processing proceeds to step S115. On the other hand, in a case where the data control unit 113 determines that the sound source separation processing is not performed in time for the real-time reproduction (NO in step S112), the processing proceeds to step S113.

In the case where the data control unit 113 determines that the sound source separation processing is not performed in time for the real-time reproduction (NO in step S112), the data control unit 113 outputs to the sound source separation unit 112 an instruction to reduce the number of channels to be used in the sound source separation processing. Further, the data control unit 113 generates a data limitation list.

Then, in step S113, the sound source separation unit 112 reduces the number of channels based on the instruction from the data control unit 113. The sound source separation unit 112 reduces the sounds (channels) to be used in the sound source separation as determined in advance, based on the instruction from the data control unit 113. In the present exemplary embodiment, the number of channels of the sound source separation of every area is uniformly reduced.

Then, in step S114, the sound source separation unit 112 records in the first storage unit 114 the sound signals of all the channels of the frame for which the number of channels is reduced. The processing then proceeds from step S114 to step S115.

In step S115, the sound source separation unit 112 performs sound source separation processing. More specifically, the sound source separation unit 112 acquires sound sources (sound signals) of the respective areas into which the space is divided based on preset borders. The acquired sound signals of the respective areas are output from the sound source separation unit 112 to the real-time reproduction signal generation unit 115 and the second storage unit 116.

In step S116 after step S115 (after the sound signals are received from the sound source separation unit 112), the real-time reproduction signal generation unit 115 mixes the sound signals for real-time reproduction. The sound signals mixed for real-time reproduction are output as a signal for real-time reproduction from the real-time reproduction signal generation unit 115 to the reproduction apparatus 119, which is an external apparatus. Alternatively, the signal for real-time reproduction can be output (transmitted) as a signal for broadcasting from the sound signal processing apparatus 100 to another apparatus, instead of being output to the reproduction apparatus 119.

In step S117, after receiving the sound signals from the sound source separation unit 112, the second storage unit 116 records the sound signals of the respective areas.

The sound signal for replay reproduction is generated using the sound signals of the respective areas that are stored in the second storage unit 116.

Next, the following processing will be described with reference to FIG. 2B: a process which is performed in a case where the load on the sound source separation unit 112 is decreased after the data control unit 113 determines in step S112 that the sound source separation processing is not performed in time for the real-time reproduction (NO in step S112 in FIG. 2A). More specifically, the processing in the case where the amount of processing performed by the sound source separation unit 112 becomes less than a predetermined amount (processing capacity) after the data control unit 113 determines in step S112 that the sound source separation processing is not performed in time for the real-time reproduction will be described.

In step S121, when the amount of processing performed by the sound source separation unit 112 becomes less than the predetermined amount (processing capacity), the data control unit 113 reads sound data (sound signal) from the first storage unit 114 based on the data limitation list. The read sound signal is transmitted to the sound source separation unit 112.

In step S122, the sound source separation unit 112 having received the read sound signal performs sound source separation processing again on the sound signals of the frame (the frame for which the number of channels is reduced in step S113) described in the data limitation list. The sound signals having undergone the sound source separation processing are output from the sound source separation unit 112 to the second storage unit 116. Specifically, for this frame, the sound signals of all the channels that have undergone the sound source separation processing are output to the second storage unit 116. In other words, for this frame, the sound signals on which the sound source separation is performed using all the channel data are output to the second storage unit 116.

In step S123, the second storage unit 116 overwrites previous sound data (sound signal) with the input sound signals of the areas to record the input sound signals.

FIG. 2C illustrates a process which is performed in a case where replay reproduction is requested. In step S131, when replay reproduction is requested, the replay reproduction signal generation unit 117 reads from the second storage unit 116 the sound signals of the respective areas corresponding to the replay time.

Then, in step S132, the replay reproduction signal generation unit 117 mixes the sound signals for replay reproduction. The sound signals mixed for replay reproduction are output from the replay reproduction signal generation unit 117 to the reproduction apparatus 119 or output as a signal for broadcasting to another apparatus.

(Advantage of First Exemplary Embodiment)

As described above, the sound signal processing apparatus 100 according to the present exemplary embodiment controls (limits, reduces) the number of microphones (channels) to be used in the sound source separation according to the amount of processing performed by the sound source separation unit 112. The limiting and/or reduction of the number of microphones leads to a decrease in the degree of sound source separation (resolution) but enables the sound signal processing apparatus 100 to complete the sound source separation in time for the real-time reproduction. Specifically, a sound defect is not likely to occur during the real-time reproduction.

More specifically, if the amount of signal processing performed by the sound source separation unit 112 is not below the predetermined amount, use of the conventional methods can cause a sound defect during the real-time reproduction. On the other hand, in the present exemplary embodiment, in the case where the amount of signal processing performed by the sound source separation unit 112 is not below the predetermined amount, the sound source separation processing is performed within a range (amount) that the sound source separation processing is performed in time for the real-time reproduction, and the sound signals are supplied to the sound reproduction unit. A sound defect is thus not likely to occur or is reduced during the real-time reproduction.

Further, in the present exemplary embodiment, the sound source separation using all the channel data can be performed in the case where the processing load on the sound source separation unit 112 is below the predetermined amount. The sound data having undergone the sound source separation using all the channel data is stored in the second storage unit 116. Use of the sound data stored in the second storage unit 116 in the replay reproduction enables replay reproduction of the sound data at sufficient resolution. In the present exemplary embodiment, since the sound source separation is performed later (in step S122 in FIG. 2B) on the areas for which the sound source separation is not completed in time for the real-time reproduction, reproduction sounds can be generated using the sound signals on which the sound source separation is completely performed during the replay reproduction. Specifically, the sound signal processing apparatus 100 outputs the sound data for real-time reproduction which is generated by executing signal processing according to the control to decrease the amount of processing on the sound data acquired by the sound collecting. After that, the sound signal processing apparatus 100 outputs sound data for replay reproduction which is generated by executing, on the sound data, the signal processing which requires more amount of processing than the amount of signal processing relating to the generating of the sound data for real-time production.

In the present exemplary embodiment, the amount of data to be used in the case where the sound source separation processing is not performed in time for the real-time reproduction is reduced by controlling the number of channels.

Modified Example

While the microphone array 111 includes the microphones in the present exemplary embodiment, the microphone array 111 can include a combination of a microphone and a structure, such as a reflection plate.

Further, the microphones which are used in the microphone array 111 can be non-directional microphones, directional microphones, or a combination thereof. Specifically, the microphone array 111 can include at least one directional microphone.

While the data control unit 113 uniformly reduces the number of channels of the sound source separation of all the areas with respect to a time frame in the present exemplary embodiment, the channel reduction rate can be changed for each area. For example, the sound signal processing apparatus 100 further includes an area importance setting unit. The area importance setting unit sets an importance (priority) for each area. The sound signal processing apparatus 100 sets the channel reduction rate according to the importance set for each area. For example, a lower channel reduction rate is set to an area with a higher importance, and a higher channel reduction rate is set to an area with a lower importance. More specifically, in a case where the sound collecting target space is a football stadium, a high importance is set to an area near a goal. Further, in a case where the sound collecting target space is a road, a high importance is set to an area near a traffic light.

Further, the importance for each area can be determined based on a sound signal of a previous frame that precedes a frame to be processed. For example, in a case where a sound continues over frames, a sudden change of processing can change the sound quality. Thus, for example, a high importance is set to an area if a sound signal level of the area in an immediately preceding frame is higher than a predetermined level. Alternatively, a high importance can be set to an area if an average sound level of the area during a predetermined time is higher than a predetermined value.

While the data control unit 113 performs the sound source separation again using the sound signals of all the channels of the frame for which the number of channels is reduced if the processing load becomes less than the predetermined amount (steps S121 and S122) in the present exemplary embodiment, a part of the channels can be used. For example, in a case where the beamforming processing of the sound source separation is delay-and-sum processing, a delay-and-sum signal of a channel that is not used in the sound source separation is added to a signal having undergone the delay-and-sum processing in the previous sound source separation. By this addition, a similar signal to the signal acquired in a case of performing the delay-and-sum processing using all the channels is acquired. Since the beamforming processing is linear processing, the channels can be divided to perform processing separately and then addition (or subtraction) can be performed afterward. In this way, an increase in the amount of processing is prevented.

While the sound source separation unit 112 performs the sound collecting for each area using beamforming in the present exemplary embodiment, any other sound source separation method can be used. For example, the power spectral density (PSD) can be estimated for each area to perform sound source separation based on the estimated PSDs using a Wiener filter.

Further, the microphones of the microphone array 111 can be directional microphones, and non-negative matrix factorization (NMF) can be used to separate crosstalk with adjacent areas. Specifically, components included in adjacent areas and having the same bases can be determined as crosstalk components, and the location of a sound source can be determined from the ratio of activity size. In this case, the processing can be performed with a reduced number of bases if the processing load is not below the predetermined amount, and the processing can be performed with a necessary and sufficient number of bases if the processing load is below the predetermined amount.

While the sound source separation unit 112 reduces the amount of processing performed by the sound source separation unit 112 by reducing the number of sound channels in the present exemplary embodiment, the amount of processing can be reduced without reducing the number of sound channels. For example, the sound source separation unit 112 can reduce the amount of processing performed by the sound source separation unit 112 by reducing the number of taps of the filter used in the sound source separation processing. For example, in the case where the processing load is not below the predetermined amount, the filter is cut into rectangular windows each having a length that is a half of the length of the filter, and the cut filter is used. Then, when the processing load becomes less than the predetermined amount, a sound filtered with the remaining half of the filter can be output and added with a delay by a sample of the half of the length of the filter. Further, the data control unit 113 can control the size and number of areas in dividing the sound-collecting target space into a plurality of areas such that the amount of processing performed by the sound source separation unit 112 does not exceed the predetermined amount of processing. In this case, the size of each of the plurality of divided areas can be controlled, and the sizes of the plurality of areas can be controlled collectively.

Alternatively, the amount of sound data processing can be controlled according to the virtual listening point (virtual listener position) and the virtual listener direction that are set in the generation of the signal for real-time reproduction. For example, a larger amount of data processing can be set for a sound signal of an area located at a smaller distance from the virtual listening point.

In the present exemplary embodiment, the replay reproduction signal generation unit 117 and the real-time reproduction signal generation unit 115 perform similar processing (mixing). Alternatively, the mixing performed by the replay reproduction signal generation unit 117 can be different from the mixing performed by the real-time reproduction signal generation unit 115. For example, in a case where the virtual listening point in the real-time reproduction is different from the virtual listening point in the replay reproduction, the mixing in the replay reproduction can be different from the mixing in the real-time reproduction.

The configuration illustrated in FIG. 1 does not include a sound signal processing unit configured to perform delay correction, gain correction, echo removal, noise removal, etc. Alternatively, for example, the sound signal processing unit can be provided as needed in a position connected to the sound source separation unit 112. Further, the sound signal processing apparatus 100 illustrated in FIG. 1 can include a display unit. If the display unit includes a user interface function, a user of the sound signal processing apparatus 100 can set the importance for each area and the like via a display screen on the display unit.

While, in the configuration illustrated in FIG. 1, the microphone array 111 is included in the sound signal processing apparatus 100, the microphone array 111 does not have to be included in the sound signal processing apparatus 100. In this case, the sound signal processing apparatus 100 (sound source separation unit 112) receives the sound signals from the microphone array 111 which is an external apparatus. Further, while, in the configuration illustrated in FIG. 1, the real-time reproduction signal generation unit 115 and the replay reproduction signal generation unit 117 are included in the sound signal processing apparatus 100, the real-time reproduction signal generation unit 115 and (or) the replay reproduction signal generation unit 117 do (does) not have to be included in the sound signal processing apparatus 100.

While, in the flow chart in FIG. 2A, step S117 is illustrated as the step to be executed after step S116, step S117 can be executed simultaneously with or before step S116.

In the above description, whether the sound source separation processing is performed in time for the real-time reproduction is determined based on the amount of processing performed by the sound source separation unit 112 and the processing capacity of the sound source separation unit 112 (step S112 in FIG. 2A). Alternatively, the determination can be performed based on the amount of processing and processing capacity of other components, etc. For example, the determination can be performed based on the amount of processing performed by the sound source separation unit 112 and the processing capacity of a central processing unit (CPU) 121 illustrated in FIG. 3. In a case where the sound source separation unit 112 includes a processing device, such as a microprocessor, the determination can be performed based on the amount of processing performed by the sound source separation unit 112 and the processing capacity of the processing device.

(Hardware Configuration)

At least a part of the functional blocks illustrated in FIG. 1 can be realized by hardware. In the case of realizing a functional block by hardware, for example, a predetermined compiler can be used to automatically generate a dedicated circuit on a field programmable gate array (FPGA) from a program for realizing the steps. Further, similar to the case of FPGA, a gate array circuit can be formed to realize a functional block as hardware. Further, an application specific integrated circuit (ASIC) can be used to realize a functional block.

FIG. 3 illustrates an example of the hardware configuration of the sound signal processing apparatus 100. In this example, the sound signal processing apparatus 100 includes the CPU 121, a random access memory (RAM) 122, a read-only memory (ROM) 123, an external memory 124, a communication interface (I/F) 125, a display unit 126, an input unit 127, and the microphone array 111. The CPU 121 can realize functions of the components of the sound signal processing apparatus 100 according to the first exemplary embodiment by executing a program stored in the RAM 122, the ROM 123, the external memory 124, etc. The CPU 121 reads a necessary program and executes the read program so that the sound signal processing apparatus 100 can realize the processes illustrated in FIGS. 2A to 2C. The communication I/F 125 is an interface for communication with external apparatuses and devices. The sound signal processing apparatus 100 can communicate with the reproduction apparatus 119 illustrated in FIG. 1 via the communication I/F 125. The display unit 126 can include various displays. The display unit 126 can display, for example, the execution status of data control by the data control unit 113 (e.g., status of reduction of the number of microphones, status of reduction of filter length). The input unit 127 can include a keyboard, pointing device (e.g., mouse), touch panel, and various switches. The user can give a request for replay reproduction to the sound signal processing apparatus 100 via the input unit 127.

While the configuration in which the microphone array 111, the sound source separation unit 112, the data control unit 113, the real-time reproduction signal generation unit 115, and the replay reproduction signal generation unit 117 are included in the sound signal processing apparatus 100 which is a single apparatus is described in the first exemplary embodiment, an exemplary embodiment of the disclosure is not limited to the above configuration. For example, a configuration (system) can be implemented in such a manner that a microphone array, a sound source separation unit, and a data amount control unit are included in a single apparatus and a reproduction signal generation unit is separated from the apparatus. Further, the microphone array can be a directional microphone array. A sound signal processing system (acoustic system) having such a configuration will be described below as a second exemplary embodiment. Similar components to those in the first exemplary embodiment are given the same reference numerals.

(Configuration of Acoustic System 200)

FIG. 4 is a block diagram illustrating the configuration of the acoustic system 200 according to the second exemplary embodiment. The acoustic system 200 includes a sound collecting/processing unit (sound collecting and processing apparatus) 210 and a reproduction signal generation unit (reproduction signal generation apparatus) 220. The sound collecting/processing unit 210 and the reproduction signal generation unit 220 are wired or wirelessly connected to each other and can transmit and receive data to and from each other via a wired or wireless transmission path (communication path) 118c. The reproduction signal generation unit 220 can be referred to as a sound signal reproduction unit.

The sound collecting/processing unit 210 includes a directional microphone array 211, a sound source separation unit 212, a data amount control unit 213, a first transmission/reception unit 214, and a first storage unit 215, all of which are connected to each other via a bus 118a.

The directional microphone array 211 includes a plurality of directional microphones. The plurality of directional microphones is, for example, a plurality of shotgun microphones. The directional microphone array 211 is arranged to collect a sound from each of N (N>1) areas into which the space is divided. The sounds collected from the respective areas undergo A/D conversion and are then output by the predetermined time frame size from the directional microphone array 211 to the sound source separation unit 212.

The sound source separation unit 212 separates a sound that is collected outside the areas and mixed with the sounds (sound source) collected from the respective areas by the directional microphone array 211. For example, a sound collected due to sidelobes generated by a directional microphone is reduced using output of another directional microphone. The data having undergone the sound source separation is output from the sound source separation unit 212 to the data amount control unit 213. Specifically, the sound source separation unit 212 outputs the processed sound signal (sound signal having undergone the sound source separation processing) to the data amount control unit 213.

The data amount control unit 213 monitors the amount of sound data communication over the transmission path 118*c* from the first transmission/reception unit 214 to the reproduction signal generation unit 220 (second transmission/reception unit 221). Then, the data amount control unit 213 controls the communication amount of sound data output from the data amount control unit 213 to the first transmission/reception unit 214 according to the monitored communication amount. For example, in a case where there is no margin for transmission of sound data of all the areas because the amount of communication (communication load) to the second transmission/reception unit 221 is not below the predetermined amount, the data amount control unit 213 combines two adjacent sound sources (sound signals) together to output the combined sound sources as a single sound source to the first transmission/reception unit 214. By performing this processing on all the areas, the communication amount is decreased to a half. Consequently, the communication amount of sound data transmitted (sent) from the first transmission/reception unit 214 to the second transmission/reception unit 221 is also decreased to a half. Specifically, it can be said that the data amount control unit 213 controls the amount of data communication from the sound collecting/processing unit 210 (first transmission/reception unit 214) to the reproduction signal generation unit 220. The case where there is no margin for transmission of sound data of all the areas refers to a case where the processing is not likely to be performed in time for the real-time reproduction if sound data of all the areas is transmitted (the case where the communication amount is not below the predetermined amount). In the case of combining the sound signals, the data amount control unit 213 generates a combination list in which area numbers, frame numbers, a gain parameter at the time of the combining, etc. of the combined sound signals are recorded. Specifically, the data amount control unit 213 performs control such that the amount of data having undergone the sound source separation processing and output from the first transmission/reception unit 214 does not exceed a predetermined amount of data. As used herein, the predetermined amount of data refers to the amount of data at which a period between a first time point when a sound is collected and a second time point when a sound based on the sound collected at the first time point and based on the sound source separation processing is reproduced is equal to a threshold value or less.

For example, when a sound signal SA of an area A and a sound signal SB of an area B are combined together at the ratio of 1:$\alpha$ ($\leq$1) to generate a sound signal SC, SC=SA+$\alpha \times$SB. In the case where the amount of data communication from the first transmission/reception unit 214 to the second transmission/reception unit 221 is equal to the predetermined amount or more, the data amount control unit 213 outputs the combined sound signal SC to the first transmission/reception unit 214. After that, when the communication amount becomes less than the predetermined amount, the data amount control unit 213 transmits the sound signal to the first transmission/reception unit 214 based on the combination list. More specifically, when the communication load is decreased and there is a margin for transmission, the data amount control unit 213 transmits the gain parameter $\alpha$, the sound signal SB of the area B, and the frame number to the first transmission/reception unit 214.

The first transmission/reception unit 214 outputs, to the reproduction signal generation unit 220, the sound signals of the respective areas that are input from the data amount control unit 213. More specifically, in the case where no data combining is performed by the data amount control unit 213, the first transmission/reception unit 214 transmits the sound signals of the areas to the second transmission/reception unit 221. In the case where the data combining is performed by the data amount control unit 213, the first transmission/reception unit 214 transmits the sound signal of the combined data to the second transmission/reception unit 221. In the case where the data amount control unit 213 transmits the sound signal to the first transmission/reception unit 214 based on the combination list, the sound signal includes the gain parameter $\alpha$.

The reproduction signal generation unit 220 includes the second transmission/reception unit 221, a real-time reproduction signal generation unit 222, a second storage unit 223, a replay reproduction signal generation unit 224, and a data restoration processing unit 225, all of which are connected to each other via a bus 118*b*. The second transmission/reception unit 221 receives the sound signals output from the first transmission/reception unit 214, and outputs the received sound signals to the real-time reproduction signal generation unit 222 and the second storage unit 223.

Further, in the case where the second transmission/reception unit 221 receives the sound data (sound signal SB) including the gain parameter $\alpha$ from the first transmission/reception unit 214, the second transmission/reception unit 221 outputs the received sound data to the data restoration processing unit 225.

The real-time reproduction signal generation unit 222, the second storage unit 223, and the replay reproduction signal generation unit 224 are respectively similar to the real-time reproduction signal generation unit 115, the second storage unit 116, and the replay reproduction signal generation unit 117 in the first exemplary embodiment.

When the data restoration processing unit 225 receives the sound signal SB, gain parameter $\alpha$, area information, and time information from the second transmission/reception unit 221, the data restoration processing unit 225 acquires the sound signal SC corresponding to the time and area from the second storage unit 223. The data restoration processing unit 225 calculates the sound signal SA (=SC$-\alpha \times$SB) of the area A using the sound signal SC acquired from the second storage unit 223 and the sound signal SB and the gain parameter $\alpha$ input from the second transmission/reception unit 221. The data restoration processing unit 225 outputs the calculated sound signal SA, the input sound signal SB, the input area information, and the input time information to the second storage unit 223. In this way, the data restoration processing unit 225 restores the sound signals SA and SB.

The real-time reproduction signal generation unit 222 mixes the sound signals input from the second transmission/reception unit 221 to generate a real-time reproduction signal.

The replay reproduction signal generation unit 224 mixes the sound signals input from the second storage unit 223 to generate a replay reproduction signal.

(Process Performed by Acoustic System 200)

Next, a process performed by the acoustic system 200 will be described below with reference to FIGS. 5A to 5C.

As illustrated in FIG. 5A, first, in step S211, the directional microphone array 211 collects sounds produced in the space. Sound signals of the collected sounds of the respective areas are output from the directional microphone array 211 to the sound source separation unit 212.

In step S212, the sound source separation unit 212 performs sound source separation processing on the input sound signals to acquire sound signals of the respective areas. The sound signals having undergone the sound source separation processing are output from the sound source separation unit 212 to the data amount control unit 213.

In step S213, the data amount control unit 213 determines whether the data transmission is performed in time for the real-time reproduction. The data amount control unit 213 estimates the time needed to complete the transmission of sound data and determines whether the data transmission is performed in time for the real-time reproduction, based on the communication load (amount of sound data transmission) on the transmission path 118c between the sound collecting/processing unit 210 and the reproduction signal generation unit 220. In a case where the data amount control unit 213 determines that the data transmission is performed in time for the real-time reproduction (YES in step S213), the data amount control unit 213 outputs the sound data of the areas to the first transmission/reception unit 214. In step S216, the first transmission/reception unit 214 transmits the sound data to the second transmission/reception unit 221.

On the other hand, in a case where the data amount control unit 213 determines that the data transmission is not performed in time for the real-time reproduction (NO in step S213), then in step S214, the data amount control unit 213 combines the sound data of two adjacent areas together. As in the example described above, the data amount control unit 213 combines the sound signal SA of the area A and the sound signal SB of the area B together at the ratio of 1:α to generate the combined sound signal SC. Information about the combination is managed as the combination list. The combined sound signal is output as sound data of the area A from the data amount control unit 213 to the first transmission/reception unit 214.

In step S215, after the combining of sound data is performed, the first storage unit 215 records the pre-combining sound data (SA, SB) and the gain parameter α in association with the time information and the area information.

In step S216 after step S215, the first transmission/reception unit 214 transmits the combined sound data to the second transmission/reception unit 221.

In step S217, the second transmission/reception unit 221 receives the sound signals of the areas transmitted from the first transmission/reception unit 214. The received sound signals of the areas are output from the second transmission/reception unit 221 to the real-time reproduction signal generation unit 222 and the second storage unit 223.

Steps S218 and S219 are similar to steps S116 and S117 in the first exemplary embodiment, so detailed description of steps S218 and S219 is omitted.

Next, the following processing will be described with reference to FIG. 5B: in a case where it is determined in step S213 in FIG. 5A that the data transmission is not performed in time for the real-time reproduction and the sounds of the areas A and B are combined together.

In step S221, when the communication load becomes less than the predetermined amount, the data amount control unit 213 reads the combined sound signal SB of the area B and the gain parameter α from the first storage unit 215 based on the combination list. The read sound signal SB and the read gain parameter α are output from the data amount control unit 213 to the first transmission/reception unit 214.

Step S222 is similar to step S216 in FIG. 5A, so detailed description of step S222 is omitted.

Then, in step S223, the second transmission/reception unit 221 receives the sound signal SB from the first transmission/reception unit 214. If the second transmission/reception unit 221 receives the sound signal SB including the gain parameter α, the second transmission/reception unit 221 outputs the sound signal SB to the data restoration processing unit 225.

In step S224, the data restoration processing unit 225 performs calculation to restore the sound signal SA of the area A. The sound signal SA calculated by the data restoration processing unit 225 is output to the second storage unit 223.

Lastly, in step S225, the second storage unit 223 records the calculated sound signal SA and the sound signal SB received in step S223.

A process in FIG. 5C which is performed in the case where a request for replay reproduction is given (steps S231 and S232) is similar to the process in the first exemplary embodiment (steps S131 and S132), so description of the process is omitted.

(Advantage of Second Exemplary Embodiment)

As described above, the acoustic system 200 according to the second exemplary embodiment combines the sound signals of adjacent areas based on the amount of sound signal transmission (amount of sound signals sent, load) over the transmission path 118c, and controls the amount of sound signals (amount of data) over the transmission path 118c. Specifically, the acoustic system 200 according to the second exemplary embodiment combines a plurality of pieces of data generated based on the sound source separation processing and respectively corresponding to different areas. By performing the control as described above, the acoustic system 200 according to the second exemplary embodiment supplies the sound signals of all the sound-collecting areas to the real-time reproduction signal generation unit 222 in time for the real-time reproduction. This enables the reproduction apparatus 119 to perform real-time reproduction (broadcasting) without (or with reduced) interruption in sound.

Further, in the replay reproduction, the acoustic system 200 can generate replay reproduction sounds for the areas (A and B) for which the combined sound signal SC is used in the real-time reproduction because the data transmission is not performed in time for the real-time reproduction, using the separated sound signals (SA and SB). In other words, reproduction sounds for all the areas are generated using original sound signals (without using the combined sound signal) in the replay reproduction. Specifically, after outputting the sound data for real-time reproduction which is based on the acquired sound data and the control to reduce the amount of data, the acoustic system 200 outputs the sound data for replay reproduction which is based on the sound data and has a larger amount of data than the sound data for real-time reproduction.

In the case where the amount of signal transmission from the first transmission/reception unit 214 to the second transmission/reception unit 221 is equal to the predetermined amount or more, use of the conventional methods can cause a sound defect during the real-time reproduction. On the other hand, in the present exemplary embodiment, the sound signals of the plurality of areas are combined together within a range that the data transmission is performed in time for the real-time reproduction, and the combined sound signal and the uncombined sound signals are transmitted from the first transmission/reception unit 214. Thus, the sound signals are delivered from the first transmission/reception unit 214 to the second transmission/reception unit 221 to ensure real-time reproduction.

While the directional microphone array 211 is used to collect sounds of the respective areas in the present exemplary embodiment, sounds can be collected using a microphone array and then the sound source separation can be performed as in the first exemplary embodiment. Further, a non-directional microphone can be placed in a substantially central position in each set area to acquire sounds.

While the data amount control unit 213 combines the sound signals of two adjacent areas in present exemplary embodiment to simplify the description, sound signals of three or more adjacent areas can be combined together. In other words, the number of areas to be combined together is not limited to two and can be three or more. For example, the data amount control unit 213 can combine sound signals of four adjacent areas together. It however should be noted that if the number of areas to be combined together is excessively large, the mixing based on the listening point can be difficult. Thus, the number of areas to be combined together is determined according to, for example, the level of difficulty of the mixing based on the listening point.

Further, the data amount control unit 213 can combine sound signals of a predetermined number of areas together based on the listening point and the listener direction in the generation of signal for real-time reproduction. The listening point and the listener direction in the generation of signal for real-time reproduction are transmitted, for example, from the real-time reproduction signal generation unit 222 to the data amount control unit 213 via the second transmission/reception unit 221 and the first transmission/reception unit 214. Then, the data amount control unit 213 combines together a plurality of pieces of data corresponding to a plurality of areas determined based on information about the acquired listening point. More specifically, the data amount control unit 213 can determine (change) the amount of data to be reduced according to the distance from the listening point to the area. In other words, areas near the listening point are not combined together in order to maintain the granularity of the areas at an appropriate level, and the number of areas to be combined together can be increased at greater distances from the listening point. Alternatively, sound signals of a plurality of areas located in substantially the same direction from the sound listening point can be combined together.

The data amount control unit 213 can include a setting unit configured to set an importance for each area. In this case, the amount of data to be reduced can be determined (changed) according to the importance.

Figure 6A:
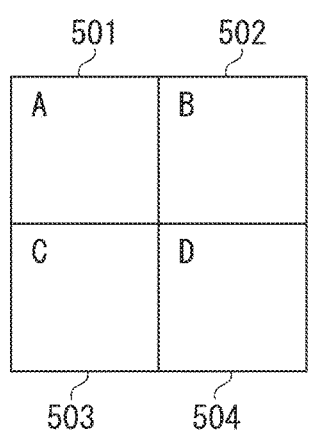
FIGS. 6A and 6B are diagrams each illustrating combining of area sounds.

In the case of reducing the number of areas by combining sound signals, the shape of the combined area does not have to be based on the shapes of the pre-combining areas. If the total number of areas is decreased as a result of the combining of the sound signals, the amount of sound signal transmission from the first transmission/reception unit 214 to the second transmission/reception unit 221 is decreased, so the shape of the combined area can be determined as appropriate by the user. FIG. 6A illustrates four areas 501, 502, 503 and 504 to be combined. Hereinafter, the four areas will be referred to as areas A, B, C, and D. The four areas (areas A, B, C, and D) in FIG. 6A are changed into three areas 503, 505, and 506 in FIG. 6B by combining the sound signals. In other words, in the example illustrated in FIGS. 6A and 6B, the four areas A to D are changed into the three areas C, E, and F. In the example illustrated in FIGS. 6A and 6B, the area C is not combined, and the areas A, B, and D are combined together into areas E and F.

Figure 6B:
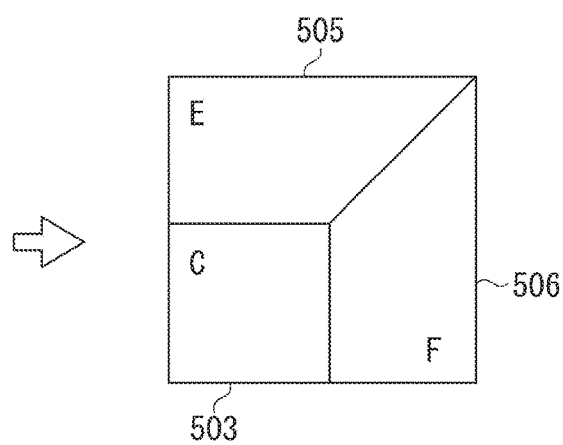

In the example illustrated in FIGS. 6A and 6B, the sound of the area C is the sound signal SC. A sound signal SE of the area E is calculated from SE=SA+SB/2, and a sound signal SF of the area F is calculated from SF=SD+SB/2.

Further, the areas for which the sound signals are to be combined together can be determined based on the sound signals of the areas. Specifically, a combination of areas to be combined together can be determined based on the sound signals of the areas. For example, sound signals of two adjacent areas are compared, and whether to combine the sound signals of the two adjacent areas can be determined based on a result of the comparison. Specifically, for example, the correlation between the sound signals of the adjacent areas is calculated, and if the correlation is equal to a predetermined value or more (if the correlation is high), the sound signals of the adjacent areas are combined together. The reason is as follows. In the areas having a high correlation, it is considered that crosstalk of sounds of the same sound source occurs between the adjacent areas, so the sound signals of the adjacent areas can be combined together.

Further, while the data amount control unit 213 reduces the number of channels and the amount of data transmission by combining the sound signals of the respective areas in the present exemplary embodiment, a different method can be used to control (limit) the amount of data. For example, the quantization bit rate or sampling frequency of sound signals of areas can be controlled. Specifically, the sound signals of areas located at great distances from the listening point are combined with a small gain in the mixing, so when the quantization bit rate of sound signals during the normal time is $2^Q$ ($Q^{th}$ power of 2), the quantization bit rate for the areas located at great distances from the listening point can be set to $2^R (R<Q)$. Further, as to the sampling frequency, a mean value of the sound signals sampled at 48 kHz during the normal time can be calculated for every two samples, and the mean value can be output as 24 kHz sound data (sound signal). In the case where the quantization bit rate is reduced as described above, the real-time reproduction signal generation unit 222 packs zero into the sound data of $2^{(Q-R)}$ bits on which the sound data reduction is performed, adjusts the bit number to the bit number of another sound data, and then performs mixing. Further, in the case where the sampling frequency is reduced, the real-time reproduction signal generation unit 222 performs interpolation, such as linear interpolation, and performs mixing on the 48 kHz sound data. The data amount control unit 213 manages in a data amount control list the controlled data (information) on the quantization bit rate and the sampling frequency. It means that details of the reduced sound data can be found by referring to the data amount control list.

When the amount of sound signal communication from the first transmission/reception unit 214 becomes less than the predetermined amount, the data amount control unit 213 outputs the reduced sound data to the first transmission/reception unit 214 based on the data amount control list. The data restoration processing unit 225 reads the sound data from the second storage unit 223 based on the time information and area information about the sound data that are transmitted from the first transmission/reception unit 214, and restores the sound data. The data amount control unit 213 can control the reduction of the quantization bit rate and sampling frequency according to the distance from the listening point to the area.

Figure 7A:
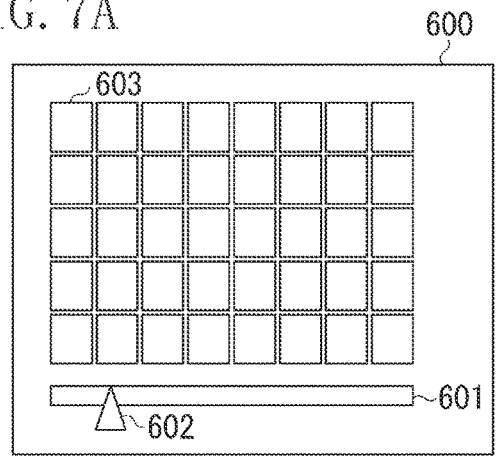
FIGS. 7A to 7G are diagrams each illustrating a display unit which displays a status of data control.
Figure 7B:
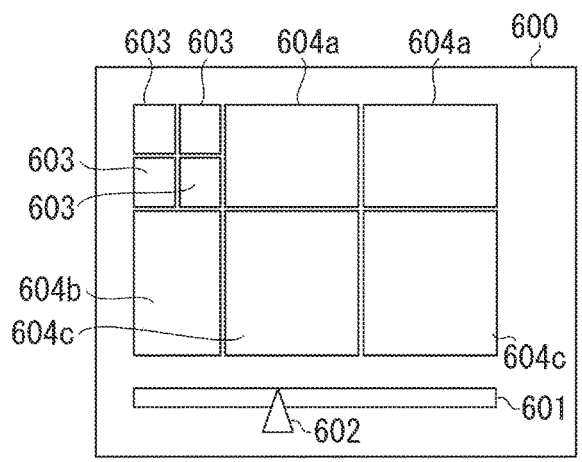
Figure 7C:
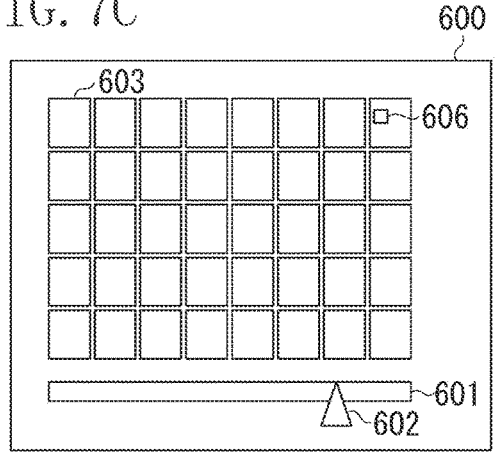

The acoustic system 200 according to the second exemplary embodiment can include a display unit configured to display the execution status of data amount control. FIGS. 7A to 7C each illustrate an example of a display screen 600 of the display unit. The display screen 600 includes a time bar 601, a time cursor 602, and areas 603. In the case where data of all areas of a frame is successfully transmitted from the first transmission/reception unit 214 to the second transmission/reception unit 221, the display screen 600 is displayed as illustrated in FIG. 7A. The display screen 600 illustrated in FIG. 7A displays the status in which the data amount control is not executed. The display screen 600 in FIG. 7A displays forty areas 603. On the other hand, in the case where the data amount control (the combining of sound signals of areas) is executed, for example, the display screen 600 is displayed as illustrated in FIG. 7B. More specifically, the display screen 600 displays four areas 603 and a plurality of combined areas 604 (two combined areas 604a, one combined area 604b, and two combined areas 604c). It means that the plurality of combined areas 603 is collectively displayed as combined areas 604a, 604b, and 604c, respectively.

Figure 7D:
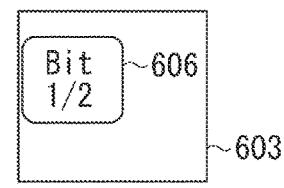
Figure 7E:
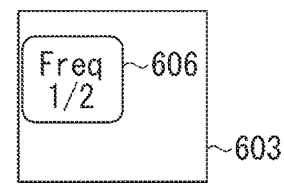

The display screen 600 in the case where the data amount control is executed is not limited to that illustrated in FIG. 7B. For example, a display 606 indicating that the data amount control is performed can be added (superimposed) on an area 603 as illustrated in FIG. 7C. For example, in the case where the quantization bit rate is controlled to 1/2, the display 606 with "Bit 1/2" is added on the area 603 as illustrated in FIG. 7D. In the case where the sampling frequency is controlled to 1/2, the display 606 with "Freq 1/2" is added on the area 603 as illustrated in FIG. 7E.

Figure 7F:
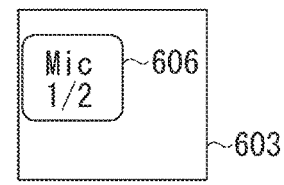
Figure 7G:
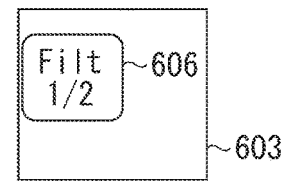

The sound signal processing apparatus 100 according to the first exemplary embodiment can also include the display unit including the display screen 600 illustrated in FIG. 7C. In a case where, for example, the number of microphones is controlled to 1/2 in the first exemplary embodiment, the display 606 with "Mic 1/2" is added on the area 603 as illustrated in FIG. 7F. Further, in a case where, for example, the filter length is controlled to 1/2, the display 606 with "Filt 1/2" is added on the area 603 as illustrated in FIG. 7G.

Further, a viewpoint during the real-time reproduction, a viewpoint during the replay reproduction, the position of an object, or the like can be superimposed and displayed on the display screen 600. Further, a full-area display can be superimposed on an image of a real space.

The display screen 600 can include not only the display function but also a function as a user interface. In this case, for example, the user of the acoustic system 200 according to the second exemplary embodiment can select at least one of the combined areas 604 on the display screen 600 and select a time interval using the time cursor 602 in the sound data restoration. The selection designates the combined area to be restored and the time interval to be restored. Further, in a case where a plurality of combined areas is to be restored, an order of restoration can also be designated.

The configurations described in the above-described exemplary embodiments can be combined. For example, first control for controlling the amount of processing as described in the first exemplary embodiment and second control described in the second exemplary embodiment can both be executed, or the first control and the second control can be switched.

According to the above-described exemplary embodiments, the amount of processing of the sound signals and the amount of sound signal transmission are limited to the predetermined amount so that sound defects are reduced during reproduction.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-128786, filed Jun. 29, 2016, which is hereby incorporated by reference herein in its entirety.

What is claimed is:

1. A sound signal processing apparatus comprising:
one or more processors; and
a memory which stores instructions executable by the one or more processors to cause the sound signal processing apparatus to perform at least:
    acquiring sound data generated by collecting a sound in a sound-collecting target space;
    detecting an amount of processing by a processor included in the one or more processors;
    causing the processor to execute signal processing for a sound in an area of a plurality of areas included in the sound-collecting target space by using the acquired sound data, wherein the signal processing is controlled based on a result of the detecting of the amount of processing by the processor, and
    outputting processed data generated based on the executed signal processing.

2. The sound signal processing apparatus according to claim 1, wherein the signal processing is controlled such that a period between a first time point when a sound is collected and a second time point when a sound based on the output processed data generated based on the signal processing using the sound collected at the first time point is reproduced is equal to a threshold value or less.

3. The sound signal processing apparatus according to claim 1, wherein the instructions further cause the sound signal processing apparatus to perform:
after outputting the processed data generated by based on the executing, the signal processing using the acquired sound data according to control to reduce the amount of processing of the processor, outputting different processed data generated based on executing signal processing which requires a larger amount of processing than an amount of processing required by the signal processing according to the control.

4. The sound signal processing apparatus according to claim 1, wherein the instructions further cause the sound signal processing apparatus to perform:
determining the plurality of areas by dividing the sound-collecting target space,
wherein the processor executes the signal processing for a sound in the area of the plurality of determined areas, and
wherein a size of the area is determined such that the amount of processing by the processor does not exceed a predetermined amount of processing.

5. The sound signal processing apparatus according to claim 4, wherein the size of each of the plurality of areas is determined in the determining.

6. The sound signal processing apparatus according to claim 1, wherein the signal processing is sound source separation processing which extracts the sound in the area of the plurality of areas from the acquired sound data.

7. The sound signal processing apparatus according to claim 6, wherein the number of sound channels to be used in the sound source separation processing such that the amount of processing performed by the processing unit does not exceed the predetermined amount of processing.

8. The sound signal processing apparatus according to claim 6, wherein the control unit controls the number of taps of a filter used in the sound source separation processing among a plurality of channels of the acquired sound data is controlled based on the result of the detecting such that the amount of processing by the processor does not exceed a predetermined amount of processing.

9. The sound signal processing apparatus according to claim 1, wherein a quantization bit rate relating to the signal processing is controlled such that the amount of processing by the processor does not exceed a predetermined amount of processing.

10. The sound signal processing apparatus according to claim 1, wherein a sampling frequency relating to the signal processing is controlled such that the amount of processing by the processor does not exceed a predetermined amount of processing.

11. The sound signal processing apparatus according to claim 1, wherein the instructions further cause the signal processing apparatus to perform:
acquiring information about a listening point corresponding to a sound for reproduction which is based on the sound data acquired,
wherein the amount of processing for the signal processing is controlled based on the information about the listening point acquired.

12. A sound signal processing apparatus comprising:
one or more processors; and
a memory which stores instructions executable by the one or more processors to cause the sound signal processing apparatus to perform at least:
acquiring sound data generated by collecting a sound in a sound-collecting target space;
executing signal processing for a sound in an area of a plurality of areas included in the sound-collecting target space by using the acquired sound data;
detecting data amount of processed data generated based on the executed signal processing, and
outputting data based on the processed data generated based on the executed signal processing executed by the processing unit,
wherein the output data is controlled based on a result of the detecting of the amount of the processed data.

13. The sound signal processing apparatus according to claim 12, wherein the output data is controlled such that a period between a first time point when a sound is collected and a second time point when a sound based on the output data based on the signal processing using the sound collected at the first time point is reproduced is equal to a threshold value or less.

14. The sound signal processing apparatus according to claim 12, wherein the instructions further cause the sound signal processing apparatus to perform:
after outputting the data based on the processed data according to control to reduce the data amount of the processed data, outputting different processed data based on the processed data and having a larger data amount than the data amount of the output data according to the control.

15. The sound signal processing apparatus according to claim 12, wherein a plurality of pieces of processed data which is generated based on the executed signal processing is combined together such that the amount of the combined data to be output does not exceed predetermined data amount, wherein the plurality of pieces of processed data respectively corresponds to different areas.

16. The sound signal processing apparatus according to claim 15, wherein the instructions further cause the signal processing apparatus to perform:
acquiring information about a listening point corresponding to a sound for reproduction which is based on the sound data acquired,
wherein a plurality of pieces of data corresponding to the plurality of areas determined according to the acquired information about the listening point is combined together.

17. The sound signal processing apparatus according to claim 12, wherein the signal processing is sound source separation processing which extracts the sound in the area of the plurality of areas from the acquired sound data.

18. The sound signal processing apparatus according to claim 12, wherein a quantization bit rate relating to the processed data is controlled such that the data amount of the output data based on the processed data does not exceed a predetermined data amount.

19. The sound signal processing apparatus according to claim 12, wherein a sampling frequency relating to the processed data is controlled such that the data amount of the output data of the processed data does not exceed predetermined data amount.

20. The sound signal processing apparatus according to claim 12, wherein the instructions further cause the signal processing apparatus to perform:

acquiring information about a listening point corresponding to a sound for reproduction which is based on the sound data acquired,
wherein the data amount of the output data is controlled based on the information about the listening point acquired.

21. A sound signal processing method executed by a sound signal processing apparatus comprising a processor, the method comprising:
acquiring sound data generated by collecting a sound from a sound-collecting target space;
detecting an amount of processing by the processor;
causing the processor to execute signal processing for a sound in an area of a plurality of areas included in the sound-collecting target space by using the acquired sound data, wherein the signal processing is controlled based on a result of the detecting of the amount of processing by the processor; and
outputting processed data generated based on the executed signal processing by the processor.

22. The sound signal processing method according to claim 21, wherein the signal processing is controlled such that a period between a first time point when a sound is collected and a second time point when a sound based on the output processed data generated based on the signal processing using the sound collected at the first time point is reproduced is equal to a threshold value or less.

23. The sound signal processing method according to claim 21, wherein the signal processing is sound source separation processing which extracts the sound in the area of the plurality of areas from the acquired sound data.

24. A non-transitory storage medium storing a program for causing a computer to execute a sound signal processing method, the sound signal processing method comprising:
acquiring sound data generated by collecting a sound from a sound-collecting target space;
detecting an amount of processing by a processor;
causing the processor to execute signal processing for a sound in an area of a plurality of areas included in the sound-collecting target space by using the acquired sound data, wherein the signal processing is controlled based on a result of the detecting of the amount of processing by the processor; and
outputting processed data generated based on the executed signal processing by the processor.

* * * * *